United States Patent
An et al.

(10) Patent No.: US 11,525,857 B2
(45) Date of Patent: Dec. 13, 2022

(54) METHOD FOR CHARACTERIZING FLUCTUATION INDUCED BY SINGLE PARTICLE IRRADIATION IN A DEVICE AND APPLICATION THEREOF

(71) Applicant: Peking University, Beijing (CN)

(72) Inventors: Xia An, Beijing (CN); Zhexuan Ren, Beijing (CN); Gensong Li, Beijing (CN); Xing Zhang, Beijing (CN); Ru Huang, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 17/744,282

(22) Filed: May 13, 2022

(65) Prior Publication Data

US 2022/0276299 A1 Sep. 1, 2022

Related U.S. Application Data

(63) Continuation of application No. PCT/CN2020/078985, filed on Mar. 12, 2020.

(30) Foreign Application Priority Data

Nov. 14, 2019 (CN) .......................... 201911111343.4

(51) Int. Cl.
*G01R 31/28* (2006.01)
*G06F 30/367* (2020.01)
*G06F 119/02* (2020.01)

(52) U.S. Cl.
CPC ....... *G01R 31/2881* (2013.01); *G06F 30/367* (2020.01); *G06F 2119/02* (2020.01)

(58) Field of Classification Search
None
See application file for complete search history.

(56) References Cited

U.S. PATENT DOCUMENTS

| 4,980,580 A | 12/1990 | Ghoshal |
| 6,867,410 B2 * | 3/2005 | Sasaki ................... G21K 1/006 250/222.2 |
| 2004/0011946 A1 | 1/2004 | Sasaki et al. |
| 2016/0285020 A1 | 9/2016 | Huang et al. |

FOREIGN PATENT DOCUMENTS

| CN | 102708230 A | 10/2012 |
| CN | 105652175 A | 6/2016 |
| CN | 108037438 A | 5/2018 |

(Continued)

OTHER PUBLICATIONS

Danghui Wang; Research on Characteristic Parameters of VDMOSFET's Anti-radiation Using on Screen; CMFD, Information Technology Series, Aug. 15, 2007; Xidian University.

(Continued)

*Primary Examiner* — Jermele M Hollington

(57) ABSTRACT

A method for characterizing a fluctuation induced by single particle irradiation in a device. A plurality of devices varying in size are tested respectively before and after irradiation to obtain threshold voltage distribution, such that a threshold voltage fluctuation induced by irradiation is obtained and used to correct a process fluctuation model, so as to correct a design margin of the devices working under the irradiation.

7 Claims, 2 Drawing Sheets

(56) References Cited

FOREIGN PATENT DOCUMENTS

CN 108494400 A 9/2018
CN 109657370 A 4/2019

OTHER PUBLICATIONS

Lichun Fan, Qun Li; Research on Automatic Synthesis Process of Analog Integrated Circuit Design; Science & Technology Information, 2013 No. 07; Tianjin Huiwei Electronics R&D Technology Co., Ltd., Tianjin 300204.

Changhwan Shin, Tsu-Jae King Liu, Ed., Borivoje Nikolic, Ed., Eugene Haller, Ed.; Advanced MOSFET Designs and Implications for SRAM Scaling; Berkely EECS, May 1, 2012; Electrical Engineering and Computer Sciences, University of California at Berkeley.

Zhexuan Ren, Xia An, Gensong Li, Xing Zhang and Ru Huang; Statistical analysis on the effects of heavy on irradiation ion 65nm bulk silicon MOS devices; Semiconductor Science and Technology, 34 (2019) 115018 (9pp); Institute of Microelectronics, Peking University, Beijing 100871, People's Republic of China.

Binxian Shao et al.;Analysis and Design of MOS Integrated Circuits; Sep. 30, 2002; p. 214-217, Fudan University press.

Zhongli Liu et al.; Silicon-on-Insulator (SOI) Technology: Manufacturing and Applications; Jul. 30, 2018; p. 285-287; National Defense Industry Press.

\* cited by examiner

METHOD FOR CHARACTERIZING FLUCTUATION INDUCED BY SINGLE PARTICLE IRRADIATION IN A DEVICE AND APPLICATION THEREOF

CROSS-REFERENCE TO RELATED APPLICATIONS

This application is a continuation of International Patent Application No. PCT/CN2020/078985, filed on Mar. 12, 2020, which claims the benefit of priority from Chinese Patent Application No. 201911111343.4, filed on Nov. 14, 2019. The content of the aforementioned applications, including any intervening amendments thereto, is incorporated herein by reference in its entirety.

TECHNICAL FIELD

This application relates to reliability evaluation of microelectronic devices, and more particularly to a method for characterizing a fluctuation induced by single particle irradiation in a device.

BACKGROUND

With the rapid development of integrated circuit technology, the feature size of MOS devices has scaled down to the nanoscale. The fluctuation of nanoscale devices is considered as an important factor affecting the device and circuit performance. With regard to nanoscale metal-oxide-semiconductor field-effect transistors (MOSFET), their performances will be affected by the fluctuation induced by process variation. For example, since the number of dopant atoms in the channel of a metal-oxide-semiconductor (MOS) device is small, the variation in the number and distribution of the dopant atoms will result in significant fluctuation of the device parameters such as threshold voltage and on-state current, and such random fluctuation is usually called random-dopant fluctuation (RDF). Moreover, the frequently-occurring intrinsic-parameter fluctuations also include line width roughness and metal-gate work-function fluctuation. The process-variation effect (PVE) on the device characteristic has become an important consideration in the design of nanoscale integrated circuits. In view of this, it is necessary to set aside a reasonable design margin to prevent functional errors in the circuits, degraded reliability and even failures caused by the fluctuation.

In addition, considering the increasingly-growing requirements for the performance of the integrated circuits in the aerospace application, it is urgently required to enhance the reliability of nanoscale integrated circuits under the irradiation. Under the exposure to the irradiation generated by heavy ions, protons and neutrons, the microelectronic device will suffer the single event effect (SEE). On one hand, charged particles will be ionized inside the device to generate a large number of electron-hole pairs, which are absorbed by the electrodes to form a single event transient current, and then generate a transient pulse in the circuit or generate a transient effect such as single event upset in a memory cell array. On the other hand, the electron-hole pairs generated from the ionization of the charged particles may be captured by traps in the oxide layer to produce micro-dose effect, or cause displacement damage in the semiconductor material. Both of the micro-dose effect and the displacement damage will lead to the degradation in the direct-current characteristic of the device such as threshold voltage shift, resulting in an increase of the mismatch in integrated circuits, performance degradation and even failure. At present, it has been extensively investigated on the single event transient effect, micro-dose effect and displacement damage; however, the effect of single event on the fluctuation of the device is still unclear.

Due to the random incidence of the single particle and the generated localized damage, the single particle irradiation may affect the characteristic fluctuation of the devices, and then affect the design margin of the integrated circuits operated under the irradiation. The irradiation induced fluctuation degradation has not been taken into consideration in the circuit design so far, and the designed circuits may suffer degraded reliability issue due to the fluctuation induced by single particle irradiation. Therefore, in order to improve the reliability of microelectronic devices and circuits under the radiation, this application provides a method for characterizing an irradiation induced fluctuation degradation in a device to correct the design margin of the circuits which work in the irradiation environment and improve the operation reliability of the circuits.

SUMMARY

An objective of this application is to provide a method for characterizing irradiation induced fluctuation degradation in a device to improve the reliability of the microelectronic devices and circuits that work in the space irradiation environment.

Technical solutions of this application are described as follows.

This application provides a method for characterizing a fluctuation induced by single particle irradiation in a device. A plurality of devices varying in size are tested respectively before and after single-particle irradiation to obtain threshold voltage distribution, such that a threshold voltage fluctuation induced by the single particle irradiation is obtained and used to correct a process fluctuation model, so as to correct a design margin of the circuits working under the irradiation.

In an embodiment, this application provides a method for characterizing a fluctuation induced by single particle irradiation in a device, comprising:

1) estimating a total irradiation flux over a life cycle of a plurality of devices to be evaluated and a particle type according to an application requirement; wherein the plurality of devices to be evaluated vary in size;

2) testing the plurality of devices to be evaluated to plot a pre-irradiation transfer characteristic curve $(I_D\text{-}V_G)_{pre}$ of the plurality of devices to be evaluated;

3) subjecting the plurality of devices to be evaluated in step (2) to single particle irradiation; and testing the plurality of devices to be evaluated to obtain a post-irradiation transfer characteristic curve $(I_D\text{-}V_G)_{post}$ of the plurality of devices to be evaluated;

4) extracting a threshold voltage $V_{T,pre}$ of each of the plurality of devices to be evaluated before irradiation; calculating a standard deviation $\sigma_{\Delta VT}$ of a threshold voltage deviation of each of the plurality of devices to be evaluated before irradiation; extracting a threshold voltage $V_{T,post}$ of each of the plurality of devices to be evaluated after irradiation; and calculating a standard deviation $\sigma_{\Delta VT}$ of a threshold voltage deviation of each of the plurality of devices to be evaluated after irradiation;

5) plotting a Pelgrom diagram $$\sigma_{\Delta VT} \sim \frac{1}{\sqrt{WL}}$$

of a threshold voltage fluctuation of the plurality of devices to be evaluated before irradiation; and plotting a Pelgrom diagram $$\sigma_{\Delta VT} \sim \frac{1}{\sqrt{WL}}$$

of a threshold voltage fluctuation of the plurality of devices to be evaluated after irradiation, wherein W is an equivalent gate width of a corresponding device; and L is an equivalent gate length of the corresponding device; and 6) calculating a fluctuation $\sigma_{SEE}$ (WL) induced by single particle irradiation in each of the plurality of devices to be evaluated according to the Pelgrom diagram of the threshold voltage fluctuation of the plurality of devices to be evaluated before irradiation and the Pelgrom diagram of the threshold voltage fluctuation of the plurality of devices to be evaluated after irradiation.

In an embodiment, the fluctuation $\sigma_{SEE}$ (WL) obtained according to the method mentioned above is used to correct a process fluctuation model of the microelectronic device to be evaluated, so as to obtain a total fluctuation $\sigma_{total}$ of the microelectronic device to be evaluated, as follows:

$$\sigma_{total} = \sigma_{SEE} + \sigma_{PV};$$

wherein $\sigma_{PV}$ is an initial process fluctuation of the microelectronic device to be evaluated.

The total fluctuation $\sigma_{total}$ is substituted into simulation to correct a design margin of the microelectronic device to be evaluated under the irradiation, so as to improve the reliability of the microelectronic device to be evaluated.

In an embodiment, the irradiation is performed using a source selected from the group consisting of a heavy ion, a proton, a neutron, an electron, a pion, a muon, an alpha particle and a combination thereof. The microelectronic device is a logic device (e.g., planar bulk silicon metal-oxide-semiconductor field-effect transistor (MOSFET), fin field-effect transistor (FinFET), nanowire and nanosheet), a power device, SiGe, Ge, GeSn, an III-V semiconductor, an III-V heterostructure or a device made of a novel channel material.

In an embodiment, the number of the plurality of devices to be evaluated is greater than 30. Increasing the number of the plurality of devices to be evaluated will improve an accuracy of an evaluation. The plurality of the devices to be evaluated cover all the sizes of devices used in circuit design.

In an embodiment, a total radiation flux and a particle type of the irradiation in step (3) are determined by the total radiation flux over the life cycle and the particle type estimated in step (1).

In an embodiment, the threshold voltage $V_{Tpre}$ and the threshold voltage $V_{Tpost}$ of each of the plurality of devices to be evaluated are extracted using a conventional method such as a maximum transconductance change method or a constant current method.

In an embodiment, when the above method corrects the design margin of the circuits, the simulation is performed using Monte Carlo simulation or Hspice simulation.

Compared with the prior art, this application has the following beneficial effects.

The method provided herein for characterizing the irradiation induced fluctuation degradation in a device has a simple calculation and a broad application, and meets the application requirements of devices of different technical generations in various irradiation environments. In addition, based on the fluctuation obtained by the method, a design margin of a circuit that works under the irradiation can be corrected, so as to improve the operation reliability of the nano-integrated circuit under the irradiation.

DETAILED DESCRIPTION OF EMBODIMENTS

This application provides a method for characterizing a fluctuation induced by single particle irradiation in a device, which is performed as follows. A plurality of devices varying in size are tested respectively before and after irradiation to obtain threshold voltage distribution, such that a threshold voltage fluctuation induced by single particle irradiation is obtained and used to correct a process fluctuation model, so as to correct a design margin of the devices working under the irradiation. This application will be described in detail below with reference to the accompanying drawings and embodiments.

Embodiment

Figure 1:
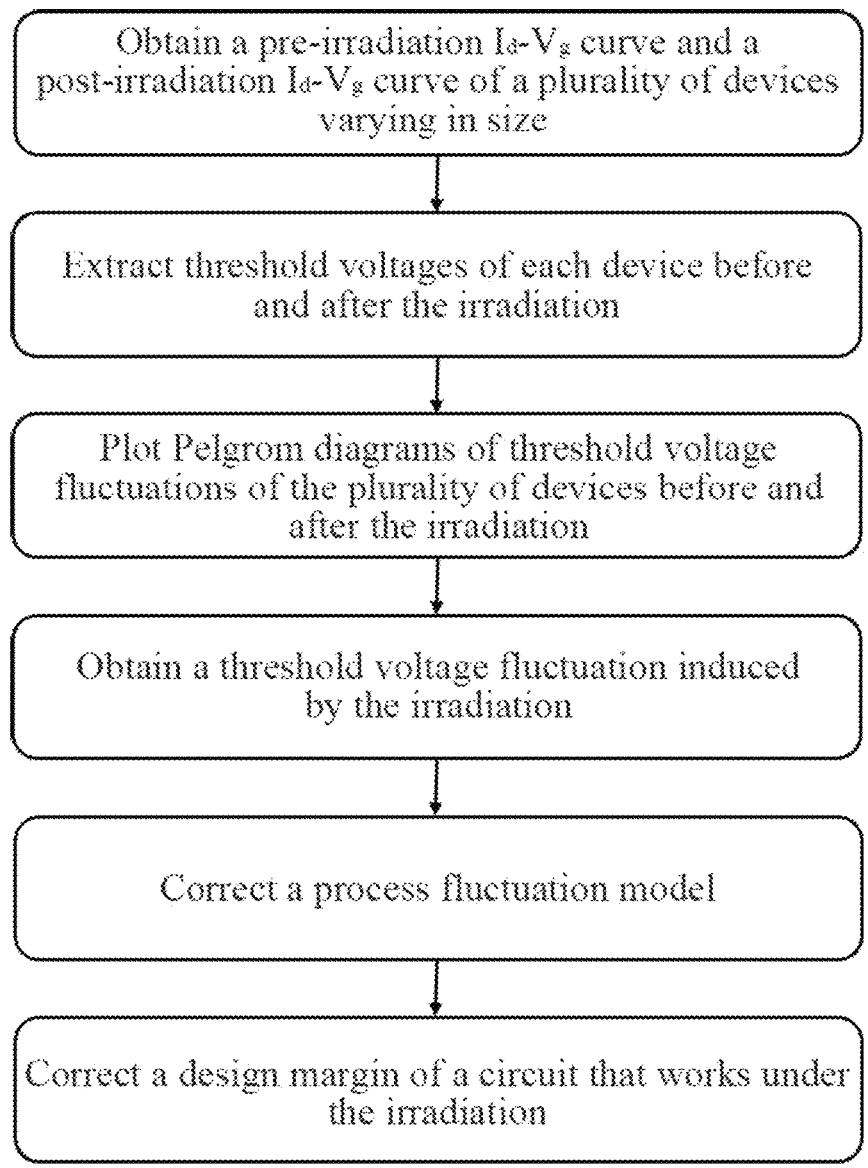
FIG. 1 is a flow chart of correcting a design margin of a circuit under the irradiation using a method for characterizing a fluctuation induced by single particle irradiation according to an embodiment of this disclosure.

In this embodiment, a plurality of samples of the N-type metal oxide semiconductor (nMOS) to be evaluated that vary in size are selected. The single particle is heavy ion. FIG. 1 shows a flow chart of a test and experiment adopted in the method provided herein. The test and experiment are performed at a room temperature, and the specific steps are as follows.

1) The samples are tested to plot a pre-irradiation transfer characteristic curve of the samples.

2) The samples are subjected to heavy ion irradiation. The heavy ion is 260 MeV iodine ion, and a total radiation flux of the heavy ion is $1.39 \times 10^{10}$ ions/cm$^2$.

3) The samples are tested to obtain a post-irradiation transfer characteristic curve of the samples.

4) A threshold voltage of each of the samples before the heavy ion irradiation and a threshold voltage of each of the samples after the heavy ion irradiation are extracted using a constant current method.

5) A standard deviation $\sigma_{\Delta VT}$ of a threshold voltage deviation of each of the samples before the heavy ion irradiation and a standard deviation $\sigma_{\Delta VT}$ of a threshold voltage deviation of each of the samples after the heavy ion irradiation are calculated.

Figure 2:
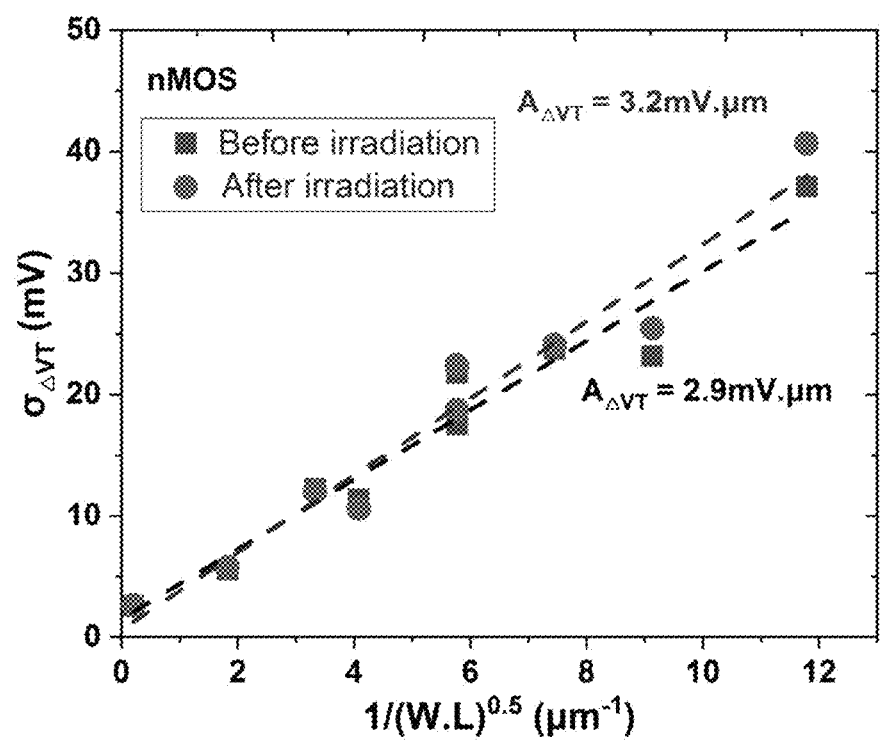
FIG. 2 is a Pelgrom diagram illustrating a threshold voltage fluctuation of the N-type metal oxide semiconductor (nMOS) before and after irradiation according to an embodiment of this disclosure.

6) A Pelgrom diagram $$\sigma_{\Delta VT} \sim \frac{1}{\sqrt{WL}}$$

of a threshold voltage fluctuation of the samples before the heavy ion irradiation and a Pelgrom diagram $$\sigma_{\Delta VT} \sim \frac{1}{\sqrt{WL}}$$

of a threshold voltage fluctuation of the samples after the heavy ion irradiation are plotted followed by linear fitting. The Pelgrom diagrams are shown in FIG. 2, and $A_{\Delta VT}$ marked in FIG. 2 is a slope obtained by linear fitting.

7) A fluctuation $\sigma_{SEE}$ induced by the heavy ion irradiation in the N-type metal oxide semiconductor to be evaluated is calculated as follows:

$$\sigma_{SEE} = \sigma_{post} - \sigma_{pre} = \frac{3.2}{\sqrt{WL}} - \frac{2.9}{\sqrt{WL}} = \frac{0.3}{\sqrt{WL}} \text{ mV};$$

where $\sigma_{post}$ is a function between the threshold voltage deviation of the samples after the heavy ion irradiation and the size of the samples; $\sigma_{pre}$ is function between the threshold voltage deviation of the samples before the heavy ion irradiation and the size of the samples; 3.2 is a slope obtained by subjecting the Pelgrom diagram $$\sigma_{\Delta VT} \sim \frac{1}{\sqrt{WL}}$$

of the threshold voltage fluctuation of the samples after the heavy ion irradiation to linear fitting (shown in FIG. 2); and 2.9 is a slope obtained by subjecting the Pelgrom diagram $$\sigma_{\Delta VT} \sim \frac{1}{\sqrt{WL}}$$

of the threshold voltage fluctuation of the samples before the heavy ion irradiation to linear fitting (shown in FIG. 2).

8) A total fluctuation $\sigma_{total}$ of the N-type metal oxide semiconductor to be evaluated is as follow:

$$\sigma_{total} = \sigma_{SEE} + \sigma_{PV};$$

where $\sigma_{PV}$ is an initial process fluctuation of the N-type metal oxide semiconductor to be evaluated.

9) The total fluctuation $\sigma_{total}$ is substituted into Monte Carlo simulation to obtain a corrected design margin of a circuit that works under the irradiation.

The fluctuation induced by SEE is obtained and adopted to correct a process fluctuation model, so as to obtain a corrected design margin of a circuit that works under the irradiation. The method has simple calculation and broad application, and improves the working reliability of the nano-integrated circuits that work under the irradiation.

Described above are merely illustrative and are not intended to limit the present application. It should be understood that various replacements and modifications made by those skilled in the art without departing from the spirit of the application shall fall within the scope of this application defined by the appended claims.

What is claimed is:

1. A method for characterizing a fluctuation induced by single particle irradiation in a device, comprising:
   1) estimating a total radiation flux over a life cycle of a plurality of devices to be evaluated and a particle type according to an application requirement; wherein the plurality of devices to be evaluated vary in size;
   2) testing the plurality of devices to be evaluated to plot a pre-irradiation transfer characteristic curve $(I_D\text{-}V_G)_{pre}$ of the plurality of devices to be evaluated;
   3) subjecting the plurality of devices to be evaluated to single particle irradiation;
   and testing the plurality of devices to be evaluated to obtain a post-irradiation transfer characteristic curve $(I_D\text{-}V_G)_{post}$ of the plurality of devices to be evaluated;
   4) extracting a threshold voltage $V_{Tpre}$ of each of the plurality of devices to be evaluated before irradiation; calculating a standard deviation $\sigma_{\Delta VT}$ of a threshold voltage deviation of each of the plurality of devices to be evaluated before irradiation; extracting a threshold voltage $V_{Tpost}$ of each of the plurality of devices to be evaluated after irradiation; and calculating a standard deviation $\sigma_{\Delta VT}$ of a threshold voltage deviation of each of the plurality of devices to be evaluated after irradiation;
   5) plotting a Pelgrom diagram $$\sigma_{\Delta VT} \sim \frac{1}{\sqrt{WL}}$$

of a threshold voltage fluctuation of the plurality of devices to be evaluated before irradiation; and plotting a Pelgrom diagram $$\sigma_{\Delta VT} \sim \frac{1}{\sqrt{WL}}$$

of a threshold voltage fluctuation of the plurality of devices to be evaluated after irradiation, wherein W is an equivalent gate width of a corresponding device; and L is an equivalent gate length of the corresponding device; and
   6) calculating a fluctuation $\sigma_{SEE}$ (WL) induced by irradiation in each of the plurality of devices to be evaluated according to the Pelgrom diagram of the threshold voltage fluctuation of the plurality of devices to be evaluated before irradiation and the Pelgrom diagram of the threshold voltage fluctuation of the plurality of devices to be evaluated after irradiation.

2. The method of claim 1, wherein the single particle irradiation is performed using a source selected from the group consisting of a heavy ion, a proton, a neutron, an electron, a pion, a muon, an alpha particle and a combination thereof.

3. The method of claim 1, wherein the number of the plurality of devices to be evaluated is greater than 30.

4. The method of claim 1, wherein a total radiation flux and a particle type of the single particle radiation in step (3) are determined by the total radiation flux over the life cycle and the particle type estimated in step (1).

5. The method of claim 1, wherein in step (4), the threshold voltage $V_{Tpre}$ and the threshold voltage $V_{Tpost}$ of each of the plurality of devices to be evaluated are extracted using a maximum transconductance change method or a constant current method.

6. A method for improving a reliability of a microelectronic device and a microelectronic circuit working under the irradiation, the method comprising:
  obtaining a fluctuation $\sigma_{SEE}$ (WL) induced by irradiation in a microelectronic device to be evaluated according to the method of claim 1;
  correcting a process fluctuation model of the microelectronic device to be evaluated using the obtained fluctuation $\sigma_{SEE}$ (WL); and obtaining a total fluctuation $\sigma_{total}$ of the microelectronic device to be evaluated as follows:

$$\sigma_{total} = \sigma_{SEE} + \sigma_{PV};$$

wherein $\sigma_{PV}$ is an initial process fluctuation of the microelectronic device to be evaluated; and
  substituting the total fluctuation $\sigma_{total}$ into simulation to correct a design margin of the microelectronic device to be evaluated under the irradiation, so as to improve reliability of the microelectronic device to be evaluated.

7. The method of claim 6, wherein the simulation is performed using Monte Carlo simulation or Hspice simulation.

\* \* \* \* \*